Feb. 28, 1933.   A. YTTERBERG   1,899,406
MEANS FOR COMPOUNDING VOLTAGE REGULATORS FOR THREE-PHASE GENERATORS
Filed July 14, 1931   2 Sheets-Sheet 1
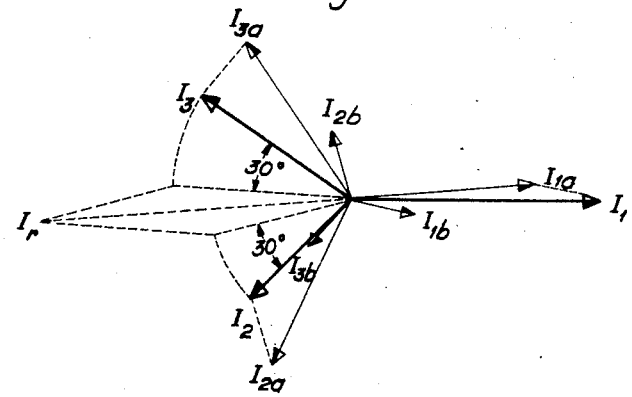
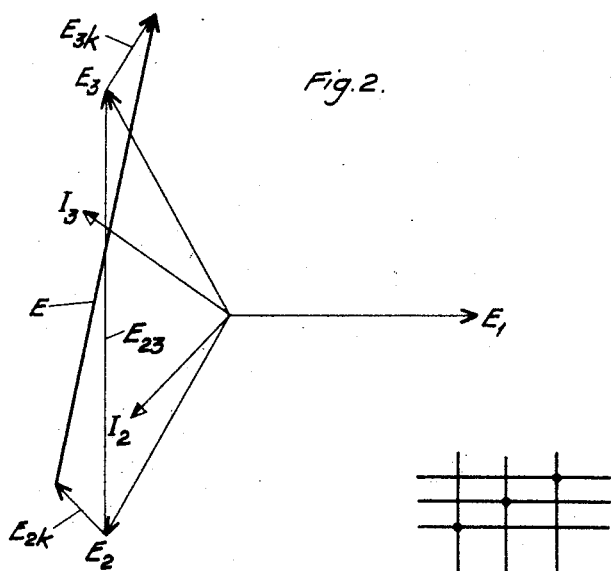
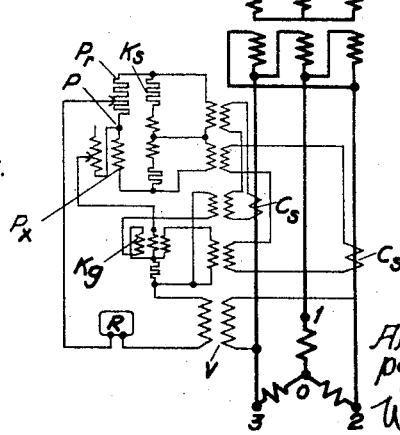
Inventor
Arle Ytterberg.
per
Wm Wallace White
Attorney.

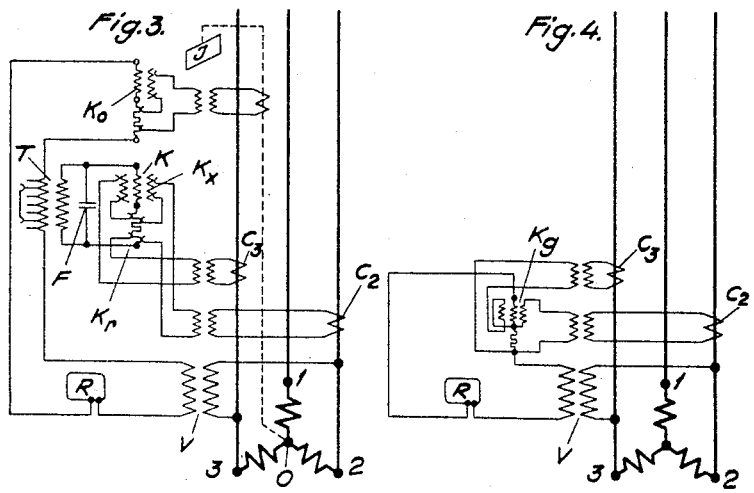

Patented Feb. 28, 1933

1,899,406

UNITED STATES PATENT OFFICE

ABLE YTTERBERG, OF HOGBERGET, LUDVIKA, SWEDEN, ASSIGNOR TO ALLMÄNNA SVENSKA ELEKTRISKA AKTIEBOLAGET, OF VASTERAS, SWEDEN, A CORPORATION OF SWEDEN

MEANS FOR COMPOUNDING VOLTAGE REGULATORS FOR THREE-PHASE GENERATORS

Application filed July 14, 1931, Serial No. 550,733, and in Sweden July 15, 1930.

When the voltage in an alternating current system sinks considerably on account of a short-circuit there is always a risk of synchronous motors connected to the system falling out of step and of the speed of asynchronous motors sinking below that corresponding to maximum torque, whereby the overload spreads over larger and larger portions of the system. When the short-circuit is a symmetrical three-phase one, by compounding the voltage regulators of the generators, the voltage in the major portion of the system may be kept at a reasonable value without great difficulty even on the occasion of a local short-circuit. Most short-circuits are, however, more or less unsymmetrical, so that the voltages on the different phases will also be unsymmetrical. The condition whereby the torque of a motor connected to the system at a certain point shall not sink below normal will, in this case, as the theory shows, be such that the so called right-way voltage star at this point retains its normal value. In any unsymmetrical polyphase alternating current system the different factors (voltage, current etc.) can be divided into one "right-way" and one "reverse" portion, which in transition to singlephase will be equal. The expressions in question involve that the phase sequence in one case is normal, and in the other case contrary to the normal one. If, for instance, the three line conductors are designated by I, II, III and, under normal conditions, the voltages between the different conductors and the neutral point reach their maximum values in the order determined by the said numbers, this will also be the case for the "right-way" component of an unsymmetrical voltage system, while the mutually equal voltages which form the "reverse" component will reach their maximum values in the different conductors in the time sequence I, III, II.

The object of the present invention is to accomplish in a simple way such a compounding of the voltage regulators for three-phase generators that at any point of the network the right-way voltage system can be kept at a substantially constant value also on the occasion of an unsymmetrical short-circuit.

In the accompanying drawings Fig. 1 shows a vector diagram illustrating the method of deriving, from an unsymmetrical threephase current start, its two symmetrical components. Fig. 2 shows another vector diagram illustrating the derivation of the induced voltage of a generator from a terminal voltage vector and two current vectors for unsymmetrical load. Figs. 3–6 show finally four examples of compounding impedances according to the invention for unsymmetrical load, founded on the aforesaid diagrams.

In Fig. 1 of the drawings, $I_1$, $I_2$, $I_3$ represent three unsymmetrical currents in a three-phase line, the vector sum of which, however, is assumed to be zero, so that no current exists through the neutral point. For dissolving such a vector star in its symmetrical right-way and reverse components, $I_2$ may for instance be rotated through an angle of 30° in the direction of the phase sequence and $I_3$ through an equal angle opposite to the said direction and the vectors thus rotated combined to a resultant vector $I_r$. For the reverse vector star this will mean the same as a rotation of the preceding vector in the phase sequence through 30° against the phase sequence and of the succeeding vector through 30° in the direction of the phase sequence, which means that the vectors which originally form 120° with one another will form an angle of 180° and their resultant thus be zero. The resultant $I_r$ just derived will therefore only contain the components of the right-way vector star. Its magnitude will be determined by the fact that the angle between the said components is only 60° instead of normally 120° which implies that the resultant vector must be divided by $$\sqrt{3}$$

in order to give a correct value of the components. The phase of the resultant is in the symmetrical vector star midway between those of the components and thus directly opposite the right-way component of $I_1$. The said component $I_{1a}$ can thus be drawn right opposite to the resultant $I_r$ and equal to $$\frac{1}{\sqrt{3}}$$

of the latter, and starting therefrom, the two remaining phases $I_{2a}$ and $I_{3a}$ of the right-way symmetrical current star may be derived. This being done, the vector difference between $I_1$ and $I_{1a} = I_{1b}$, the vector difference between $I_2$ and $I_{2a} = I_{2b}$ and the vector difference between $I_3$ and $I_{3a} = I_{3b}$ are derived. It is then found that the three vectors $I_{1b}$, $I_{2b}$, $I_{3b}$ form a symmetrical star with the phase sequence opposite to that of the original vectors which is a criterion of the correctness of the method employed.

It can be easily demonstrated that the right-way voltage star at any point of the network depends only on the originally induced symmetrical machine voltage and the voltage drops produced by the right-way current star. In order to keep the right-way voltage star constant at any point of the network, it is therefore only necessary to compound the induced voltage for this voltage drop. When the machine voltage is regulated by a voltage regulator connected to the machine terminals in series with so called compounding impedances, the matter will, however, not be quite so simple for the reason that the voltage between the machine terminals is not the induced voltage but contains also the voltage drop in the machine, which is unsymmetrical to the same extent as the voltage drop in the lines. In order to derive the induced machine voltage (depending on the air gap flux), the voltage regulator must first be negatively compounded for the voltage drop in the machine. This is accomplished according to the principle illustrated in Fig. 2. If the induced machine voltages in this figure are $E_1$, $E_2$, $E_3$, the induced voltage between the phases 2 and 3 will be $E_{23}$. The currents $I_2$ and $I_3$ which are assumed to have the same magnitude and phase as in Fig. 1 will cause in their respective windings voltage drops $E_{2k}$, $E_{3k}$ which for the sake of simplicity may be assumed to be purely inductive and thus perpendicular to the currents. The resultant terminal voltage will be $E$, and this voltage is obtained in a voltage transformer connected between the terminals. In order to derive the induced voltage $E_{23}$ from $E$, compounding impedances are connected in series with the voltage transformer, said impedances being traversed by currents proportional to the currents $I_2$ and $I_3$ and reproducing in phase and magnitude the voltage drops $E_{2k}$, $E_{3k}$. Further, if according to the aforesaid the voltage drop at a point distant from the machine shall be compounded, there may be inserted other impedances operating on the principle illustrated in Fig. 1. These impedances, in practice, since they should also be traversed by the currents from the phases 2 and 3, may be combined with the former ones in a common apparatus, the adjustment of which for different compounding may be accomplished for instance by means of a line diagram.

In Fig. 3 of the drawings, 1, 2, 3 designate the three phases of a threephase generator and 0 its neutral point. Between the phases 2 and 3, there is connected a voltage transformer V, and in the conductors from the said phases there are inserted current transformers $C_2$, $C_3$. These operate a compounding impedance K which is partly common to both and consists of self inductance $K_x$ and ohmic resistance $K_r$, the whole being so arranged that the currents are combined according to the principle illustrated in Fig. 1 and a voltage proportional to the resultant and under an appropriate phase angle against the latter is obtained. If it is assumed, for instance, that the voltage drop to be corrected by compounding is purely inductive, the voltage added shall be in phase with the resultant of the currents rotated in their respective directions through 30°, because this resultant is perpendicular to the voltage between the phases 1 and 2 if the current and voltage are in phase. In this case it is therefore only necessary to arrange in such a way that the impedances of the two current paths are numerically equal and their phase angles are $+30°$ for one impedance and $-30°$ for the other. The phase angle of an impedance is defined as the phase angle between the voltage between its terminals and the current traversing the impedance. Generally speaking, the impedances of the two current paths shall be numerically equal and possess phase angles, the difference of which is 60°. By means of an adjustable transformer T, the exciting current of which is delivered by a condenser F, the numerical value of the additional voltage may be accurately regulated. This additional voltage is finally combined with the voltage from the transformer V and impressed on the regulator R.

In Fig. 3 there is also shown another compounding device which in some cases is necessary or desirable. If the vector sum of the currents in the three phases is not zero, a current flows also through the neutral point and is generally equally distributed between the three phases. These currents do not cause any voltage drop in its proper sense, that is, a reduction of the right-way voltage star at any point of the network, but only a displacement of the neutral point of the said star in relation to that of the generator. Since the impedance K is traversed by the currents in two phases, the voltage produced thereby will, however, contain a component proportional to the neutral point current which must be compensated in order to cause the voltage regulator to produce the desired voltage on the machine. For this purpose the current between the generator neutral point 0 and the earth J will influence a compounding impedance $K_o$ dimensioned so as to compensate the aforesaid undesirable voltage component.

In Fig. 3 no respect has been paid to the voltage drops in the generator itself. Fig. 4 on the contrary, shows an arrangement for this purpose, founded on the diagram shown in Fig. 2. The regulator and the voltage and current transformers are here designated in the same way as in Fig. 3 but the compounding impedance is designated by $K_g$ and is assumed to be so dimensioned as to produce two voltage components according to Fig. 2. As the impedances necessary for this purpose always should be the same for a given machine, a particular transformer for regulating the numerical value is superfluous.

Fig. 5 shows an example of the complete compounding diagram for a power station having two generators and an outgoing line. For each generator there is here provided a compounding impedance $K_g$ for compounding inwards to the induced voltage, an impedance $K_s$ for compounding for the voltage drop in the connections between the generator and the bus bars including a transformer therebetween, and an impedance $K_1$ for compounding for the voltage drop in the line. The impedance $K_s$ as well as the impedance $K_g$ are fed from current transformers $C_s$ and the former one is preferably so dimensioned as to leave a small portion of the voltage drop uncompensated for effecting stability between the generators. The impedance $K_1$ is fed by current transformers $C_1$ in the line and should of course, for the delta-star connection of the power transformer shown, be dimensioned in a corresponding manner, so as to give the correct phase of the additional voltage. Otherwise the same reference letters designate the same parts in this figure as in Fig. 3.

The compounding impedances $K_g$ and $K_s$ may be combined into one if desired, but the division into two has among others the advantage that the regulation will be more simple, for instance if it is desired to parallel the generators directly instead of through transformers. The impedance $K_s$ may then simply be adjusted to zero value. $K_g$ may also be combined with a sufficient portion of $K_s$ for compounding substantially to the generator terminals for the right-way symmetrical load. A small portion of the voltage drop caused hereby should, however, always remain for stabilizing purposes.

Fig. 6 shows a particular form of such compounding impedances $K_s$ which should be capable of regulation in magnitude and/or phase, such regulation being very easily accomplished in this arrangement. As aforesaid, the difference between the phase angles of the two impedances should be 60°. Now, if the phase angle of one of said impedances is 15° and of the other 75°, the phase angle of their resultant will be 45°, as they are equal in numeric value. This will mean that if an impedance P containing numerically equal resistance $P_r$ and reactance $P_x$ is connected in parallel to $K_s$, the voltage on one of these latter components will be exactly in phase and on the other exactly in quarter-phase with the current. By adjustable taps on these two components the desired voltage is therefore very easily obtained without the use of any diagram. Otherwise the reference symbols in this figure correspond to those of Figs. 3 and 5.

I claim as my invention:

1. In voltage regulators for threephase generators, a threephase generator, a voltage regulator and compounding impedances connected in series between two terminals of said generator, said impedances being numerically equal but differing in phase angle by 60°, and current transformers adapted to force currents proportional to the currents flowing out from said two terminals to flow through said impedances.

2. In voltage regulators for threephase generators, a threephase generator, a voltage regulator and compounding impedances connected in series between two terminals of said generator, two of said impedances being numerically equal but differing in phase angle by 60°, two other of said impedances being mutually equal in numerical value as well as phase angle and corresponding to the impedances in the machine, and current transformers adapted to force currents proportional to the currents flowing out from each of said two terminals through one of each of said pairs of impedances.

3. In voltage regulators for threephase generators, a threephase generator, a voltage regulator and compounding impedances connected in series between two terminals of said generator, two of said impedances being numerically equal but differing in phase angle by 60°, current transformers adapted to force currents proportional to the current flowing out through said two terminals to flow through said impedances, and a current transformer adapted to force a current proportional to the current flowing between the generator neutral and earth through one of said compounding impedances.

4. In voltage regulators for threephase generators, a threephase generator, a voltage regulator, two impedances having phase angles of respectively 15° and 75°, current transformers adapted to force currents proportional to the currents flowing out from two terminals of said generator through said impedances, and an impedance consisting of numerically equal resistance and reactance connected in parallel to said impedances, adjustable portions of said last-mentioned impedance being connected in series with said voltage regulator between said generator terminals.

In testimony whereof I have signed my name to this specification.

ARLE YTTERBERG.